UNITED STATES PATENT OFFICE.

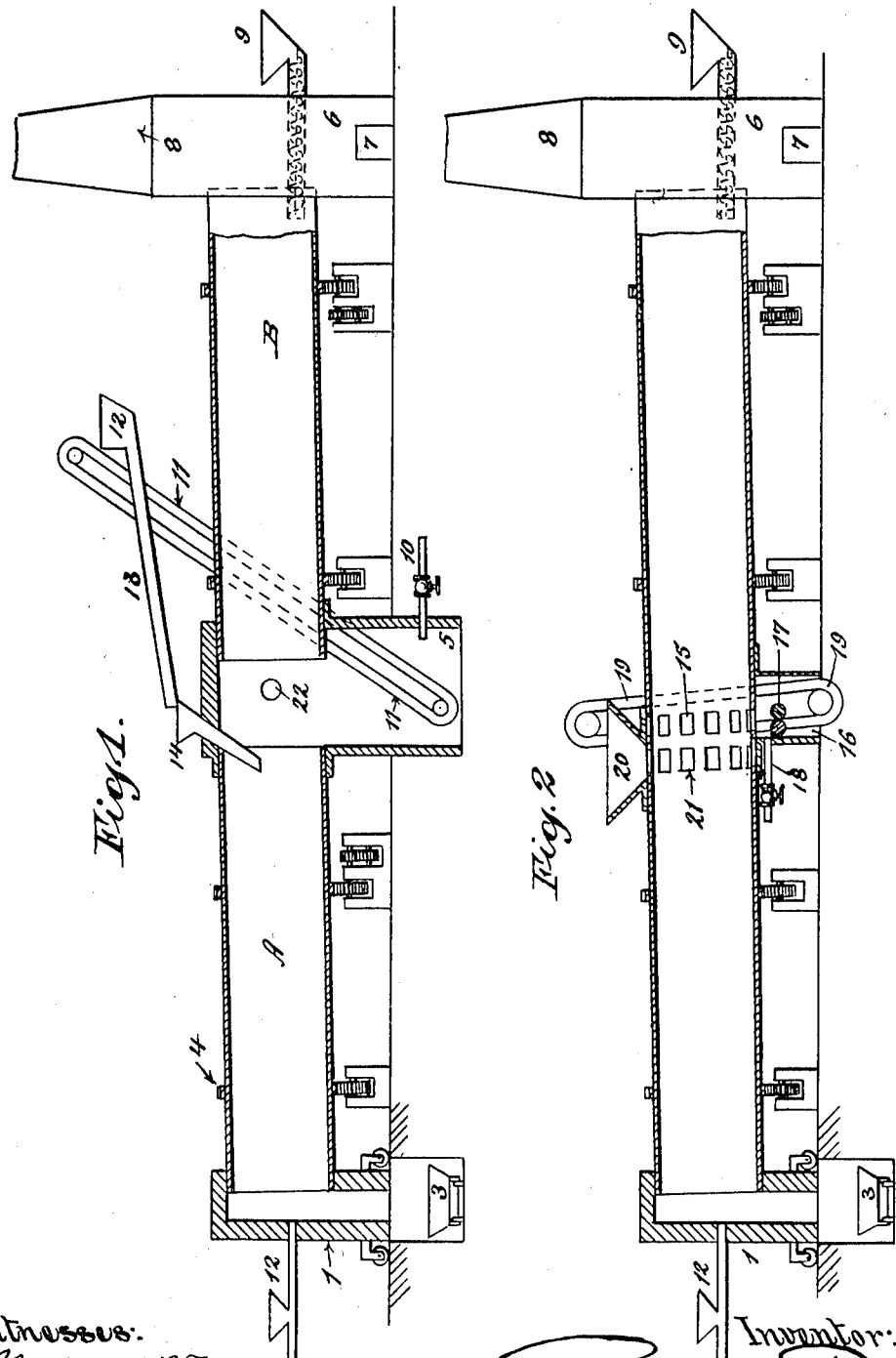

CARLETON ELLIS, OF LARCHMONT, NEW YORK, ASSIGNOR TO ELLIS-FOSTER COMPANY, A CORPORATION OF NEW JERSEY.

PROCESS OF MAKING CEMENT.

1,001,582.   Specification of Letters Patent.   Patented Aug. 22, 1911.

Application filed May 7, 1909.   Serial No. 494,700.

*To all whom it may concern:*

Be it known that I, CARLETON ELLIS, citizen of the United States, residing at Larchmont, in the county of Westchester and State of New York, have invented certain new and useful Improvements in Processes of Making Cement, of which the following is a specification.

This invention relates to processes of making cement; and it comprises a method of producing cement in rotary inclined kilns wherein coarsely ground cement material is first calcined, partially or completely, in the presence of flame gases admixed with a modicum of water vapor, are then reground to form a fine powder and are clinkered.

In the customary method of manufacturing cement in this country, fine ground cement materials are passed downward through a rotary inclined kiln as a traveling stream in heating relation to a flame burning in the mouth of the kiln and the flame gases of the same passing upward through the kiln. Under the influence of the flame gases the traveling material first loses its water of combination, then loses its carbon dioxid, or becomes calcined, and finally the lime thus formed unites with the silicates in the mixture to form cement clinker; a hard granular or nodular material which when fine ground produces ordinary cement. The raw material used may be cement rock, which is substantially a natural mixture of clay and limestone, with the addition of more or less lime to bring it to a standard composition, or it may be an artificial mixture of fine ground limestone, marl or shells with ground clay or slate. Marl is not always as satisfactory since it is so voluminous as to cut down substantially the amount of material which may be passed downward through the kiln in a time unit with a given thickness of stream. Ground slate is sometimes substituted for ground clay for similar reasons being denser. It is considered substantially necessary that the materials sent through the kiln should be very finely ground both to secure good admixture and to produce a traveling stream of the right characteristics. This preliminary fine grinding of the material is, however, expensive since with the rotary kiln it is desirable to use a mixture ground in a dry state. Limestone and cement rock are comparatively hard materials. Slate and shale are also rather hard. This preliminary fine grinding is therefore responsible for a large part of the cost of making cement.

In the present invention I have devised a cheap, simple and ready manner of obviating much of this expense of the preliminary fine grinding and of securing certain other advantages. In lieu of fine grinding the raw material directly, I merely crush or grind it so far as to produce a coarse, granular material. This is of course much less expensive than grinding to a flour-like fineness as is the usual practice. This coarsely ground material I pass downward through a rotary inclined kiln in the usual manner, calcining it completely or partially. This results in a coarsely granular mass in which the particles are indefinitely porous and susceptible of easy comminution. The clay component of the mixture in dehydration becomes porous and easily ground, and so also does the limestone component. While it is not necessary for the present purposes to calcine to completeness, since any loss of carbon dioxid makes lime rock or cement rock much more easily comminuted, yet in practice it is desirable to carry the calcination as far as may be. The described step of calcining the coarsely ground material prior to comminution is also useful with such comparatively soft materials as marl, shells and clay, since these materials are converted into the powdered form in dry grinding much more easily after such calcination, and moreover, since their objectionable bulkiness largely disappears. The calcined coarsely ground material is next treated with a modicum of water, the amount used preferably not being sufficient to slake the lime present or to moisten it. This addition of water at this point has a number of useful results. It breaks up the structure of the calcined material, thereby aiding in the subsequent comminution, it cools the material and renders it better adapted for treatment in ordinary grinding apparatus, and it furnishes some water vapor which can be led back into the kiln and used to assist in calcination. While the treatment of the hot calcines with the water results in some loss of heat, (that equivalent to the latent heat of the water vaporized) yet this loss is more than counterbalanced by the advantage of the aid to calcination afforded by the water vapor produced if this be introduced in the calcining section of the kiln. Steam may be used in quenching and cooling the calcines in lieu of water, if desired, but its use presents no substantial advantage thereover.

The coarsely ground calcined material after the moisture treatment breaks down in texture materially, and is much reduced in temperature. The cooled material is next taken to a grinding apparatus and reduced to a flour-like powder and this powder is restored to the kiln and caused to advance downwardly against a current of flame gases coming from a clinkering flame in the mouth of the kiln. As the material travels downward, it loses its residual carbon dioxid, if not already completely calcined, and coming into the immediate vicinity of the clinkering flame the lime and the silicates unite together to form the sintered aggregate known as cement clinker.

A great advantage of the described procedure is in the reduction of the loss by dusting. In the ordinary method where the finely ground material is calcined, a considerable percentage of the calcining material is picked up as dust by the swiftly moving flame gases in the calcining zone, and is carried toward the rear end of the kiln and some portion is even removed from the kiln. This almost completely calcined material may be carried to the rear portion of the kiln and deposited with raw or only partly calcined material resulting in loss in efficiency. The present invention aims to overcome such wasteful shifting of the material. By conducting the materials through the calcining zone in a coarsely ground condition, this loss by dusting is very much reduced.

The described process may be carried out by any suitable apparatus. It is convenient however to use a rotary kiln apparatus comprising a pair of coöperating sections, either in line or superimposed, and an intermediate stationary housing wherein calcines from the upper kiln are deposited. These calcines are there moistened, the steam produced being allowed to join the flame gases going through the kiln sections and the intermediate housing. The moistened and cooled calcines may be removed from the housing by any convenient form of conveyer mechanism, led to any convenient type of grinder, reground to a fine powder and reintroduced in the lower kiln section, there to be clinkered.

In the accompanying illustration I have shown more or less diagrammatically, sundry of the many apparatus embodiments of the described invention.

In this showing:—Figure 1 is a longitudinal vertical section of one modification of such apparatus, showing two kiln sections in line with an intermediate stationary housing; and Fig. 2 is a longitudinal vertical section of a single rotary kiln provided with means for removing calcined materials and returning the same after regrinding at points intermediate its length.

In the showing of Fig. 1, A and B respectively are rotary kiln sections which may be called the clinkering and calcining sections respectively. At its lower end, A enters the usual movable hood 1 provided with firing means 12 here shown as the usual coal blast. Clinker discharged into the hood falls therethrough into the usual clinker pit 3. The kiln section is provided with the usual drive means 4. At its upper end, this kiln section enters stationary housing 5 into which the lower end of the kiln section B also enters. At its upper end B enters housing 6 provided with dust door 7, stack 8 and feeding means 9. The intermediate stationary housing is provided with a pipe 10 adapted to introduce water or steam. Conveyer 11 is adapted to withdraw material from the housing chamber and transmit it to grinding apparatus 12. Conveying means 13 transfer the fine ground material to feed hopper 14 for introduction into the clinkering section.

The structure of Fig. 2 is the same as that of Fig. 1, save in lieu of using two kiln sections separated by an intermediate stationary housing, a single integral kiln is used. Intermediate its length, this kiln is provided with a series of orifices 15 allowing calcined material to fall therethrough into the hopper 16 of regrinding apparatus 17. Pipe 18 allows a spray of water to be passed on the material going to the grinding apparatus. Ground material is delivered by conveyer 19 to hopper 20 whence it is returned to the kiln through orifices 21.

The operation of the foregoing structures is obvious. With the structure of Fig. 1, using cement rock, the coarsely ground or crushed rock is fed through 9 into B where it is calcined under the conjoint influence of the hot flame gases from A and the aqueous vapor coming from 5. The calcined material is deposited in the chamber of housing 5 where it is exposed to a water spray humidifier, or steam jet from 10, and cooled and made friable. The amount of water used ordinarily should not be sufficient to produce any true slaking, merely enough being employed to break down the structure of the calcines without leaving much if any moisture therein. The presence of a little moisture or water of hydration in the calcines however, does no harm. The cooled and friable material is removed from the housing chamber by the conveyer and is reground. The reground material is delivered into 14 where it may be admixed with lime or other materials to render its composition standard, and is then delivered into the clinkering kiln where it is converted into cement clinker. If the material be not already perfectly calcined, any remaining carbon dioxid is removed in the upper end of clinker section A. So also is any moisture of water of hydration which may remain in it. In the lower end of A the material is clinkered in the usual manner. Using mixtures of limestone with clay or slate the coarsely ground admixed materials may be introduced into 9 as described in the case of cement rock. Or the limestone component alone may be there introduced and fine ground clay added in 14 which then serves as a mixing device. Or, if desired, two kiln sections in parallel may enter 5, one receiving the limestone component of the mixture and the other receiving the clay or slate component. This is not usually desirable since it is simpler to mix the coarsely ground materials and feed in through 9 allowing calcination of the limestone component and hydration of the clay or slate component going on simultaneously. With Fig. 2 the operation is the same. The coarsely ground material entering the upper end of the kiln through 9 is calcined and the calcined material drops through the orifices 15 as each successively comes to the under side in the rotation of the kiln, into 16, where such material is moistened. The vapor formed in the moistening ascends into the kiln through these orifices 15 and joins the flame gases therein to aid in calcination. The cooled and disintegrated calcines are reground in 17 and passed to hopper 20 where the composition of the material may be standardized by the addition of lime, etc. The powder in 20 falls into the kiln through orifices 21 as each successively comes into register with 20.

The water used after moistening the calcines may of course carry in solution any desired ingredient, such as calcium chlorid or sulfate which it is desired to add to the cement material.

What I claim is:—

1. The process of making cement clinker which comprises calcining granular cement materials as a traveling stream, adding a limited amount of water to the calcines, regrinding and clinkering the reground material.

2. The process of making cement clinker which comprises calcining cement materials as a traveling stream in a rotary kiln, adding a limited amount of water, regrinding and clinkering the reground material in a rotary kiln.

3. The process of making cement clinker which comprises calcining cement materials, adding a limited amount of water to disintegrate the calcined material and furnish aqueous vapor, transferring the aqueous vapor to aid in calcination, regrinding the calcined material and clinkering the reground material.

4. The process of making cement clinker which comprises calcining cement materials in a rotary kiln, adding a limited amount of water to disintegrate the calcined material and furnish aqueous vapor, transferring the aqueous vapor to the kiln to aid in calcination, regrinding the calcined material and clinkering the reground material.

5. The process of making cement clinker which comprises calcining cement material in a rotary inclined kiln section by heated flame gases and admixed aqueous vapor, adding a limited amount of water to disintegrate the calcined material and form aqueous vapor, transferring the vapor to the kiln to aid in calcination, regrinding the calcined material and clinkering the reground material in a rotary kiln, said calcining kiln section drawing flame gases from said rotary clinkering kiln.

6. The process of making cement clinker which comprises calcining cement materials as a traveling stream sufficiently to expel at least part of the contained carbon dioxid, adding water in amount insufficient to produce slaking, regrinding and clinkering.

7. The process of making cement clinker, which consists in crushing cement raw material to a coarse granular form, calcining the granulated material as a traveling stream, adding to the calcines a quantity of water, sufficient to substantially cool said calcines but insufficient to materially slake them, in regrinding the cooled calcines and clinkering the reground material, said process being conducted throughout in a continuous and non-cumulative manner.

In testimony whereof I have affixed my signature in presence of two witnesses.

CARLETON ELLIS.

Witnesses:
NATHANIEL L. FOSTER,
FRANCES I. NEWMAN.